(12) United States Patent
Jiang

(10) Patent No.: US 12,044,889 B1
(45) Date of Patent: Jul. 23, 2024

(54) PHOTONIC CHIP MODULE

(71) Applicant: SUTENG INNOVATION TECHNOLOGY CO., LTD., Shenzhen (CN)

(72) Inventor: Peng Jiang, Shenzhen (CN)

(73) Assignee: SUTENG INNOVATION TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 18/617,700

(22) Filed: Mar. 27, 2024

(30) Foreign Application Priority Data

May 9, 2023 (CN) .......................... 202310511788.1

(51) Int. Cl.
G02B 6/42 (2006.01)
(52) U.S. Cl.
CPC .................. G02B 6/4246 (2013.01)
(58) Field of Classification Search
CPC ...... G02B 6/30; G02B 6/4214; G02B 6/4246; G01S 7/4811; G01S 7/4813; G01S 7/4812; G01S 7/4818
See application file for complete search history.

(56) References Cited

U.S. PATENT DOCUMENTS 10,222,474 B1 * 3/2019 Raring ................ H01S 5/02212

* cited by examiner

Primary Examiner — Michael P Mooney
(74) Attorney, Agent, or Firm — BAYES PLLC

(57) ABSTRACT

The present embodiment discloses a photonic chip module, LiDAR, and a mobile device. The photonic chip module includes a photonic chip and a reflection unit. The photonic chip includes a cladding and multiple first transceiving waveguide modules. The first transceiving waveguide module is embedded in the cladding, and the first emergent end and the first incident end are arranged at intervals along a first preset direction, collectively forming the first transceiving end of each first transceiving waveguide module, with these ends being spaced along a second preset direction. The reflection unit includes multiple reflection modules arranged along the second preset direction. Each reflection module has a first reflection surface. The photonic chip module provided in this embodiment is advantageous for increasing the detection field of view of the LiDAR under the same resolution conditions.

17 Claims, 11 Drawing Sheets

PHOTONIC CHIP MODULE

CROSS-REFERENCE TO RELATED APPLICATION

The present application claims the benefit of priority to Chinese Patent Application No. 202310511788.1, filed on May 9, 2023, which is hereby incorporated by reference in its entirety.

TECHNICAL FIELD

This application relates to the field of laser detection technology, particularly to a photonic chip module, a LiDAR, and a mobile device.

TECHNICAL BACKGROUND

Frequency Modulated Continuous Wave (FMCW) LiDAR systems include light source module, photonic chip module, scanning module, and photoelectric detection module. The light source module is used to generate detection light and local oscillator light. The photonic chip module includes an emitting waveguide and a receiving waveguide. The emitting waveguide is used to transmit the detection light and to emit it via the emergent end to detect target objects. The receiving waveguide is used to receive the echo light via its incident end, and the echo light is formed by the target object reflecting the detection light. The scanning module includes a rotatable scanning device, which is used to receive the detection light emitted by the photonic chip module and reflect it to create a specific detection field outside the LiDAR. In addition, the scanning module is also used to receive the echo light so that the echo light is reflected back to the receiving waveguide of the photonic chip module. The photoelectric detection module is used to receive the above-mentioned local oscillator light and the echo light, so that the two optical signals beat to generate a beat frequency signal and perform photoelectric conversion on the beat frequency signal. The emergent end of the transmitting waveguide and the incident end of the receiving waveguide are staggered in the plane where the photonic chip is located. The staggered direction corresponds to the fast-axis scanning direction of the LiDAR (such as the horizontal detection direction), which is intended to alleviate the offset phenomenon of the spot of the echo light that is caused by the fast-axis scanning.

In related art, some photonic chip modules include one transmitting waveguide and one receiving waveguide. Under the condition that the resolution in the slow-axis scanning direction of the LiDAR meets the requirements, the detection field of view in the slow-axis scanning direction of the LiDAR (such as the vertical detection direction) is relatively small. That is, the detection field of view that can be achieved by current photonic chip modules is still small.

SUMMARY

Embodiments of the present application provide a photonic chip module, a LiDAR, and a mobile device to improve the current situation of small detection field of view in LiDAR systems.

In a first aspect of embodiment of the present application provides a photonic chip module comprising a photonic chip and a reflection unit. The photonic chip includes a cladding and multiple first transceiving waveguide modules. Each first transceiving waveguide module is embedded in the cladding and consists of a first emitting waveguide and a first receiving waveguide. The first emitting waveguide has a first emergent end for transmitting detection light, and the first receiving waveguide has a first incident end for receiving echo light formed by a target object reflecting the detection light. The first emergent end and the first incident end of each module are arranged at intervals along a first preset direction, collectively forming a first transceiving end. The reflection unit includes multiple reflection modules arranged along a second preset direction, each corresponding to a first transceiving waveguide module. The photonic chip has opposite first and second surfaces along the thickness direction, with the first surface having placement grooves for holding parts of the reflection modules. Each reflection module has a first reflection surface opposite the first transceiving end along the second preset direction, reflecting the detection light and echo light. The first preset direction, the second preset direction, and the thickness direction are perpendicular two-by-two.

In a second aspect of embodiment of the present application provides a LiDAR comprising the aforementioned photonic chip module.

In a third aspect of embodiment of the present application provides a mobile device comprising the above-mentioned LiDAR.

The photonic chip module includes the photonic chip and the reflection unit. The photonic chip includes multiple first transceiving waveguide modules, each including a first emitting waveguide for transmitting detection light and a first receiving waveguide for receiving echo light. The first emergent end of the first emitting waveguide and the first incident end of the first receiving waveguide are spaced along the first preset direction, collectively forming a first transceiving end, arranged along the second preset direction. The reflection modules are arranged along the second preset direction, corresponding to the first transceiving waveguide modules. The first reflection surface of each reflection module is opposite the first transceiving end along the second preset direction, allowing the detection light emitted through each first reflection surface to be staggered along the second preset direction, forming multiple corresponding sub-detection fields externally of the LiDAR, collectively constituting the total detection field of the LiDAR. The photonic chip module is advantageous in increasing the detection field of view of the LiDAR under the same resolution conditions or improving the resolution under the same total detection field conditions.

BRIEF DESCRIPTION OF DRAWINGS

To provide a clearer explanation of the technical solutions in the embodiments described in this application, a brief introduction to the drawings required in the embodiments or related art descriptions will be presented below.

EXPLANATION OF REFERENCE NUMERALS IN THE DRAWINGS

1. Photonic chip module; 100. Photonic chip; 110. Substrate; 120. Cladding; 130. First transceiving waveguide module; 140. Second transceiving waveguide module; 150. Third transceiving waveguide module; 131. First emitting waveguide; 132. First receiving waveguide; 141. Second emitting waveguide; 142. Second receiving waveguide; 151. Third emitting waveguide; 152. Third receiving waveguide; 1311. First input end; 1312. First emergent end; 1321. First incident end; 1322. First output end; 1412. Second emergent end; 1421. Second incident end; 1512. Third emergent end; 1521. Third incident end; 101. First surface; 102. Second surface; 103. First side; 104. Second side; 105. Third side; 106. Fourth side; 107. Placement groove; 200. Reflection unit; 210. Reflection module; 220. Base; 211. First reflection surface; 212. Second reflection surface; 213. Third reflection surface; 201. Third surface; 202. Fourth surface; 2. LiDAR; 21. Light source module; 22. Scanning module; 23. Photoelectric detection module; 24. Transceiver lens; 3. Mobile device; X. First preset direction; Y Second preset direction; Z. Third preset direction.

DETAILED DESCRIPTION

The following description, when referring to the accompanying drawings, unless otherwise indicated, the same numbers in different drawings represent the same or similar elements. The exemplary embodiments described below do not represent all embodiments consistent with the present application.

A photonic chip module includes a transmitting waveguide and a receiving waveguide, and the detection field of view in the slow axis scanning direction, such as the vertical detection direction, of the LiDAR is relatively small. Some of the existing photonic chip modules stack multiple sets of transceiving waveguides in the thickness direction of the photonic chip. Since the thickness direction is perpendicular to the plane of the photonic chip, it allows the detection fields of each layer of transceiving waveguides to be stacked in the slow axis scanning direction, such as the vertical detection direction, thereby enhancing the LiDAR's field of view in the vertical direction. However, the high process difficulty of stacking multiple layers of transceiving waveguides in the thickness direction of the photonic chip makes it unsuitable for mass production.

Figure 1:
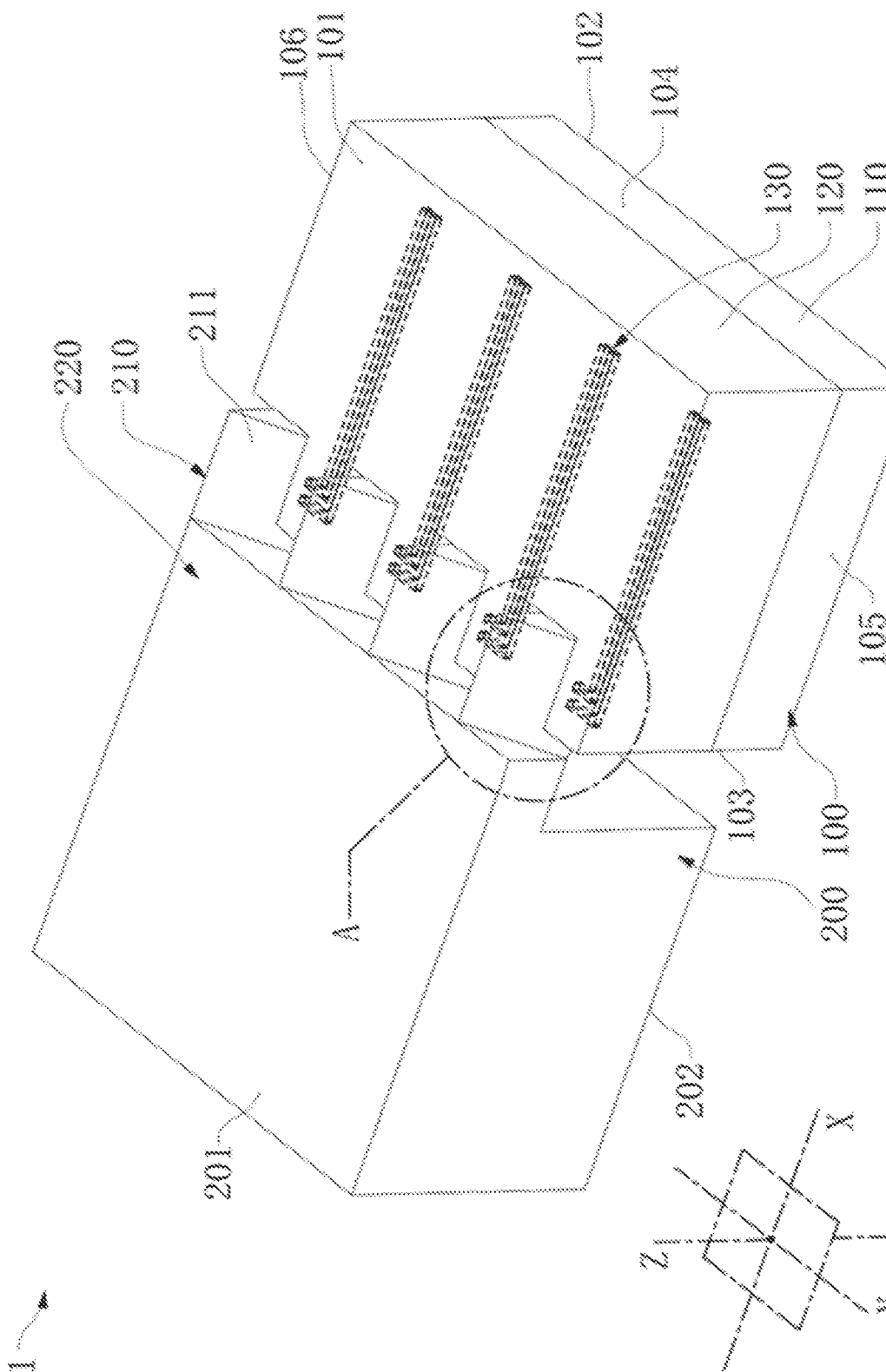
FIG. 1 illustrates a perspective view of a photonic chip module provided in some embodiments of the present application.
Figure 2:
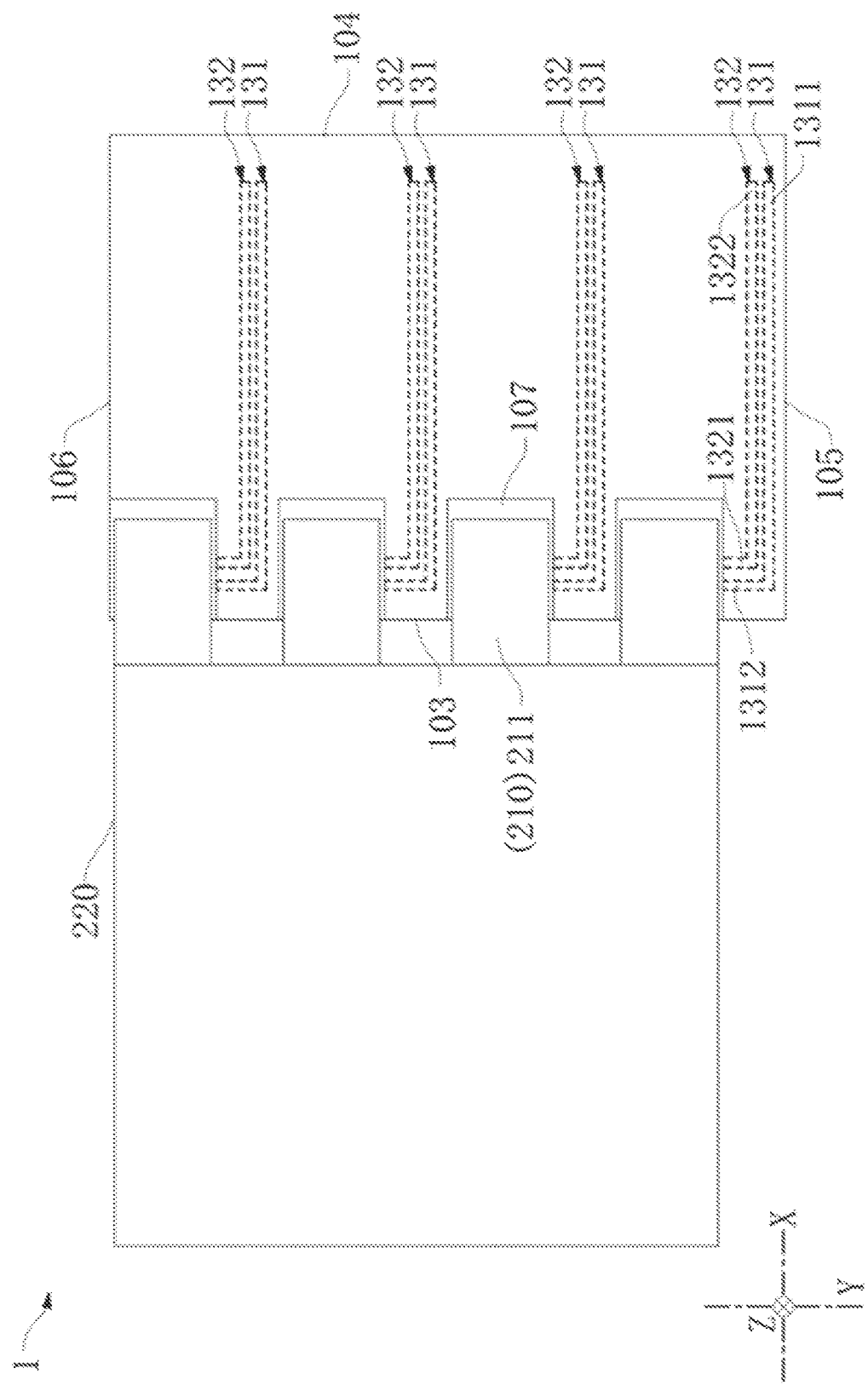
FIG. 2 illustrates a top view of the photonic chip module in FIG. 1.

FIG. 1 illustrates a perspective view of a photonic chip module provided in some embodiments of the present application. FIG. 2 illustrates a top view of the photonic chip module in FIG. 1.

In some embodiments, referring to FIGS. 1 and 2, the photonic chip module 1 includes a photonic chip 100 and a reflection unit 200. The photonic chip 100 includes a cladding 120 and multiple first transceiving waveguide modules 130 embedded in the cladding 120. The first transceiving waveguide module 130 includes a first emitting waveguide 131 and a first receiving waveguide 132. A first emergent end 1312 of the first emitting waveguide 131 is spaced apart from a first incident end 1321 of the first receiving waveguide 132 along a first preset direction as shown in FIG. 2. The first emergent end 1312 of the first emitting waveguide 131 is used to transmit detection light. The first incident end 1321 of the first receiving waveguide 132 is used to receive the detection light. The first emergent end 1312 and the first incident end 1321 collectively form the first transceiving end of the first transceiving waveguide module 130. The first transceiving ends of multiple first transceiving waveguide modules 130 are spaced apart along a second preset direction Y as shown in FIG. 1. The reflection unit 200 includes multiple reflection modules 210 arranged along the second preset direction Y, each corresponding to one of the first transceiving waveguide modules 130. Each reflection module 210 has a first reflection surface 211. The first reflection surface 211 is oppositely arranged along the second preset direction Y with the first transceiving end of the first transceiving waveguide module 130 to reflect the detection light emitted by the first emitting waveguide 131 so that the detection light is emitted in a direction not perpendicular to the thickness direction of the photonic chip 100. Consequently, the detection light emitted by each first transceiving waveguide module 130 will be staggered along the second preset direction Y after being reflected by the corresponding reflection module 210, allowing the detection lights to stack in the slow axis scanning direction. When this photonic chip module 1 is applied in a LiDAR system, each detection light emitted by each first transceiving waveguide module 130 will form a sub-detection field outside the LiDAR, and all these sub-detection fields together constitute the detection field of the LiDAR, thereby increasing the overall detection field of the LiDAR.

In an embodiment, the photonic chip 100 is a flat structure. The "first preset direction" is a direction perpendicular to the thickness direction Z of the photonic chip 100, which is determined as the direction when observed along the thickness direction Z, where the first emergent end 1312 and the first incident end 1321 of the first transceiving end point to each other. The "second preset direction" is a direction perpendicular to both the thickness direction Z and the first preset direction X.

In an embodiment, please refer to FIG. 1, the photonic chip 100 includes a substrate 110, a cladding 120, and multiple first transceiving waveguide modules 130. The substrate 110 is a base material for laying the cladding 120. In an embodiment, the substrate 110 is made of silicon. In an embodiment, the substrate 110 can also be made of other suitable materials, such as silicon nitride. The cladding 120 is deposited or grown on the substrate 110, and the direction in which they are stacked is the thickness direction Z of the photonic chip 100. The cladding 120 is one of the main structures constituting the photonic chip 100 and is also the structure to which the first transceiving waveguide modules 130 are attached. The material of the cladding 120 is generally different from that of the substrate 110 and is made of materials such as silicon dioxide and/or silicon nitride. The first transceiving waveguide module 130 is used to receive and transmit the detection light generated by a light source module inside the LiDAR, to emit it outward to detect a target object, to receive an echo light formed by the target object reflecting the detection light, and to transmit the echo light. The first transceiving waveguide module 130 is embedded in the cladding 120, and the refractive index of the first transceiving waveguide module 130 is greater than that of the cladding 120. Thus, the first transceiving waveguide module 130 and the cladding 120 collectively constitute a structure for stable light transmission. Light can be transmitted along the first transceiving waveguide module 130 without easily leaking out of the cladding 120 to the outside of the photonic chip 100. For example, when the cladding 120 is made of silicon dioxide, the structure in the first transceiving waveguide module 130 may include materials with a higher refractive index, such as silicon nitride and/or silicon. The substrate 110 is intended to support the cladding 120 during the manufacturing process of the photonic chip 100, in some cases, the substrate 110 may be omitted.

The photonic chip 100 has a first surface 101 and a second surface 102 arranged opposite to each other along the thickness direction Z. In an embodiment, the first surface 101 is a side of the cladding 120 away from the substrate 110, and the second surface 102 is a side of the substrate 110 away from the cladding 120. In an embodiment, the first surface 101 is a side of the substrate 110 away from the cladding 120, and correspondingly, the second surface 102 is a side of the cladding 120 away from the substrate 110. The photonic chip 100 also has a first side 103 and a second side 104 opposite to each other along the first preset direction X, and a third side 105 and a fourth side 106 opposite to each other along the second preset direction Y The third side 105 is located on one side of the first reflection surface 211 facing the corresponding first transceiving end, and the fourth side 106 is located on the opposite side. The first side 103, the third side 105, the second side 104, and the fourth side 106 are connected in sequence.

Figure 3:
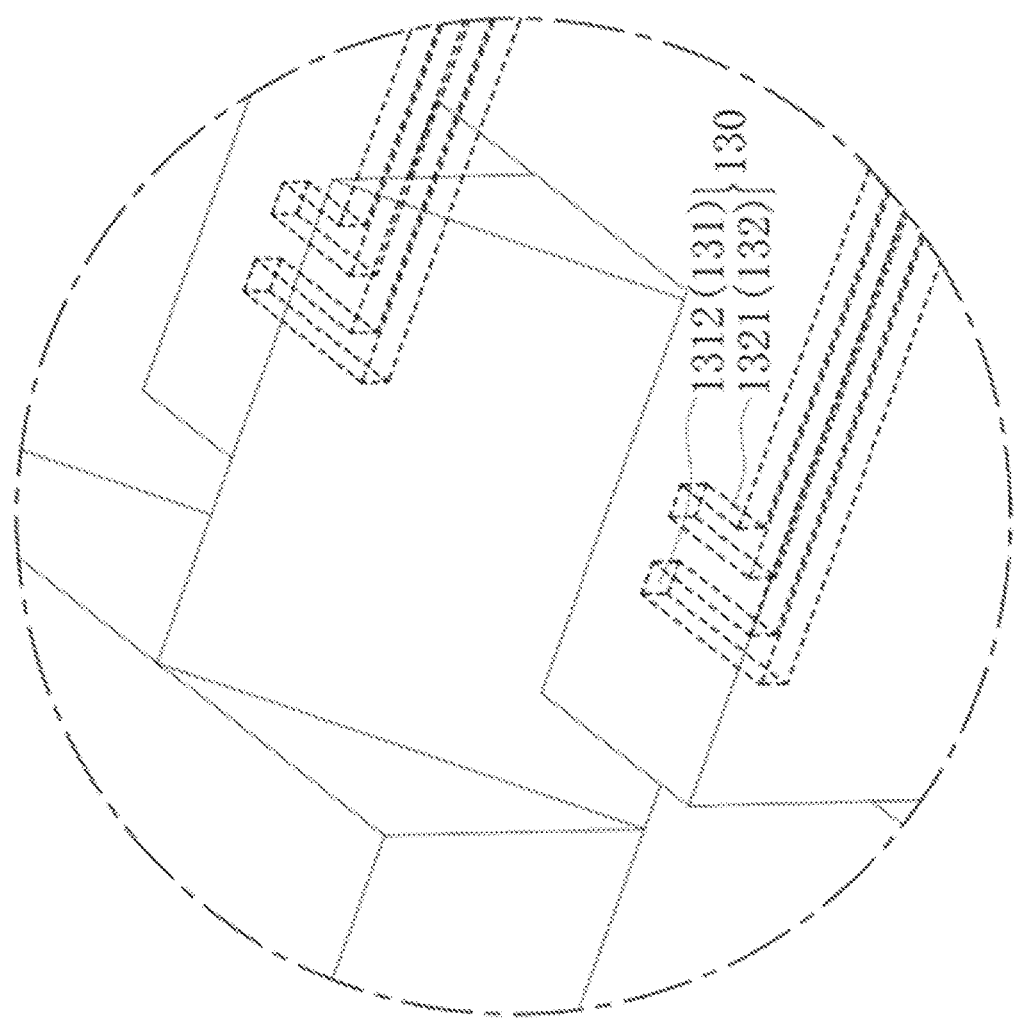
FIG. 3 illustrates a partial enlarged view at position A in FIG. 1.

FIG. 3 illustrates a partial enlarged view at position A in FIG. 1.

In an embodiment, refer to FIG. 3, combined with FIGS. 1 and 2, the first transceiving waveguide module 130 includes a first emitting waveguide 131 and a first receiving waveguide 132. The first emitting waveguide 131 is used to transmit detection light, and has a first input end 1311 and a first emergent end 1312 located oppositely along the extension direction. The first emitting waveguide 131 receives the detection light generated by the light source module via the first input end 1311 for transmission within the first emitting waveguide 131. The detection light is emitted through the first emergent end 1312 of the first emitting waveguide 131 to detect target objects outside the LiDAR system. The first receiving waveguide 132 has a first incident end 1321 and a first output end 1322 located oppositely along the extension direction. The first receiving waveguide 132 receives the echo light via the first incident end 1321 to allow the echo light to enter and propagate within the photonic chip 100. The echo light is then output to downstream photoelectric detection module through the first output end 1322 of the first receiving waveguide 132 (not shown in the figures). The first emergent end 1312 and the first incident end 1321 are positioned close to each other and face the same direction, namely the second preset direction Y, to facilitate the emission of detection light and reception of echo light at this location.

In an embodiment, when observed along the aforementioned thickness direction Z, the first emergent end 1312 and the first incident end 1321 are arranged at intervals along the illustrated first preset direction X. The first emergent end 1312 and the first incident end 1321 collectively form the first transceiving end of the first transceiving waveguide module 130. In an embodiment, the "first emergent end" means the structure formed by extending a preset distance from the light-emergent end face of the first emitting waveguide 131 towards the above-mentioned first input end 1311. In an embodiment, the first emergent end 1312 is linear. The "first incident end" means the structure formed by extending a preset distance from the light-receiving end face of the first receiving waveguide 132 towards the above-mentioned first output end 1322. In an embodiment, the first incident end 1321 is linear.

In an embodiment, during the process of the detection light being reflected to the target object by the scanning module and the echo light returning to the scanning module, the scanning module has already rotated a certain angle, causing the spot where the echo light finally falls on the photonic chip 100 to have a certain positional offset relative to the spot where the detection light was emitted. For illustration purposes, this effect is referred to as the walk-off effect. If the distance between the first emergent end 1312 and the first incident end 1321 is too large, it is easy for the echo light reflected by nearby target objects to fail to smoothly fall on the first incident end 1321 of the first receiving waveguide 132, leading to a detection blind zone. The distance between the first emergent end 1312 and the first incident end 1321 cannot be too large. In an embodiment, the distance between the first emergent end 1312 and the first incident end 1321 within the same first transceiving waveguide module 130 is less than 10 microns. The range within which a single first receiving waveguide 132 can receive light is limited, so multiple first receiving waveguides 132 can be set to increase the light field for receiving echo light. In some embodiments, the first transceiving waveguide module 130 includes multiple first receiving waveguides 132, and the first incident ends 1321 of each first receiving waveguide 132 are arranged at intervals along the aforementioned first preset direction X.

In an embodiment, the scanning rate of the fast-axis scanning device of the scanning module is clearly higher than that of the slow-axis scanning device, thus the walk-off effect caused by the fast-axis scanning device is more pronounced, and the walk-off effect caused by the slow-axis scanning device is smaller. Therefore, the direction of the above-mentioned first emergent end 1312 and the first incident end 1321 spaced apart as mentioned above should be matched with the direction of the fast-axis scanning, which is consistent with the direction of the fast-axis scanning.

The first transceiving ends of the first transceiving waveguide modules 130 are arranged along the second preset direction Y The portion of each first emitting waveguide 131 other than the first emergent end 1312 is bent towards the first preset direction X relative to the first emergent end 1312, facilitating the entry of detection light. In an embodiment, the bending direction of each first emitting waveguide 131 is the same to allow the detection light to enter from nearby positions. For example, as shown in FIG. 2, the other part of each first emitting waveguide 131 bends and extends to the right side relative to the first emergent end 1312. The first emitting waveguide 131 can also undergo one or more additional bends on the basis mentioned above to facilitate the input of detection light. The portion of each first receiving waveguide 132 other than the first incident end 1321 is bent towards the first preset direction relative to the first incident end 1321 to facilitate the output of echo light. In an embodiment, the bending direction of each first receiving waveguide 132 is the same to allow each first receiving waveguide 132 to output echo light in the same direction; for example, as shown in FIG. 1, the other part of each first receiving waveguide 132 bends and extends to the right side relative to the first incident end 1321. The first receiving waveguide 132 can also undergo one or more additional bends on the basis mentioned above to facilitate the output of echo light to the photoelectric detection detection module.

In an embodiment, where the direction in which the first transceiving end of each of the first transceiving waveguide modules 130 emits detection light is the same, the structure of the photonic chip module 1 is explained. In some other embodiments, the directions in which at least two first transceiving waveguide modules 130 emit detection light are opposite.

In an embodiment, refer to FIG. 1, the reflection unit 200 includes multiple reflection modules 210. The first surface 101 of the photonic chip 100 is provided with a placement groove 107 for holding at least a part of the reflection module 210. Each placement groove 107 corresponds to one of the first transceiving ends of the first transceiving waveguide modules 130, and multiple placement grooves 107 are arranged along the second preset direction Y Each placement groove 107 is located on the side where the first transceiving end of the corresponding first transceiving waveguide module 130 emits detection light. The reflection module 210 is then placed in the placement groove 107 and has a first reflection surface 211. The first reflection surface 211 is oppositely arranged along the second preset direction Y with the first transceiving end of the first transceiving waveguide module 130. The first reflection surface 211 is used to reflect the detection light so that the detection light is emitted in a direction not perpendicular to the thickness direction of the photonic chip 100. The first reflection surface 211 is also used to reflect the echo light so that the echo light is directed towards the first incident end 1321 of the first receiving waveguide 132. The reflection modules 210 are arranged along the second preset direction Y and are placed in the corresponding placement grooves 107, each corresponding to a respective first transceiving waveguide module 130.

In an embodiment, the first preset direction X should match a direction with a faster scanning rate of the scanning module. In an embodiment, the horizontal scanning (with the scanning axis extending vertically) rate of the scanning module is clearly higher than the vertical scanning (with the scanning axis extending horizontally) rate. The walk-off effect direction caused by the horizontal scanning direction matches the first preset direction X, thereby ensuring that the first receiving waveguide 132 can receive the echo light. That is, the first preset direction X corresponds to the horizontal scanning direction of the LiDAR, while the second preset direction Y can be configured to correspond to the vertical direction of the LiDAR. The arrangement of the multiple first transceiving waveguide modules 130 and multiple reflection modules 210 allows the detection light emitted by each first transceiving waveguide module 130 to collectively form multiple sub-detection fields arranged along the vertical direction on the outer side of the LiDAR, and these sub-detection fields together constitute the detection field of the LiDAR. In some embodiments, if the vertical scanning rate of the scanning module is clearly higher than the horizontal scanning rate, then it should be ensured that the walk-off effect direction caused by the vertical scanning direction matches the aforementioned first preset direction X. Thus, the detection light reflected by the first reflection surface 211 of each reflection module 210 will be staggered in the second preset direction Y, meaning the detection light emitted by each reflection module 210 outside the LiDAR will be staggered horizontally to form multiple corresponding detection fields, and these multiple detection fields collectively constitute the total detection field of the LiDAR. Therefore, arranging the first transceiving ends of multiple first transceiving waveguide modules 130 and multiple reflection modules 210 along the second preset direction Y can enhance the total detection field of the LiDAR.

In some embodiments, the angle between the first reflection surface 211 and the thickness direction Z can range from 40° to 50°. For example, the angle between the first reflection surface 211 and the thickness direction Z is 45°. The detection light reflected by the first reflection surface 211 can be emitted outside the photonic chip 100 along the thickness direction Z. In an embodiment, the first reflection surfaces 211 can be arranged parallel to each other along the second preset direction Y, so that the directions of the detection light reflected by each first reflection surface 211 are the same. In an embodiment, the first reflection surfaces 211 along the second preset direction Y are evenly spaced at intervals. This arrangement aims to make the field of view angle covered in the vertical direction by each first transceiving waveguide module 130 roughly the same.

In some embodiments, the placement groove 107 is located at an end of the photonic chip 100 close to the first side 103, in other words, the first side 103 is the side close to the placement groove 107. An end of the placement groove 107 along the first preset direction X extends to the first side 103. That is, along the first preset direction X, one end of the placement groove 107 penetrates the first side 103 of the photonic chip 100. Since the placement grooves 107 are arranged along the second preset direction Y, the setting of penetrating the first side 103 of the photonic chip 100 along the first preset direction X is conducive for the reflection module 210 to enter the placement groove 107 through the penetrated end, facilitating the assembly of the reflection module 210.

In some embodiments, an end of a placement groove 107 along the second preset direction Y near the fourth side 106 extends to the fourth side 106. This configuration facilitates the assembly of the reflection module 210 when it enters the placement groove 107. Because the placement groove 107 does not have side walls at the end away from the corresponding first transceiving waveguide module 130, interference between the reflection module 210 and the side walls caused by the side walls of this side can be avoided.

In some embodiments, the reflection unit 200 includes abase 220. The base 220 is located on one side of the photonic chip 100 where the placement groove 107 is provided, and the reflection modules 210 are fixed on the base 220 towards one end of the photonic chip 100. The base 220 and the reflection modules 210 form an integral structure. This configuration fixes the relative positional relationship of the reflection modules 210, thereby facilitating the one-time assembly of the reflection modules 210.

The base 220 has a third surface 201 and a fourth surface 202 opposite to each other along the thickness direction Z as mentioned above. The third surface 201 is close to the first surface 101, and the fourth surface 202 is close to the second surface 102. In an embodiment, the fourth surface 202 is coplanar with the second surface 102, making it easier to apply adhesive to the fourth surface 202 and the second surface 102 to fix them on the same substrate.

In an embodiment, there is a gap between the reflection module 210 and the bottom wall of the placement groove 107. This configuration provides a certain safety distance for the reflection module 210 and the placement groove 107, which helps ensure that the reflection module 210 can be set in the desired position during actual assembly. In an embodiment, when the reflection module 210 is in close contact with the bottom wall of the placement groove 107, the tolerance of the process etching of the placement groove 107 may cause interference between the reflection module 210 and the bottom wall of the placement groove 107, preventing the reflection module 210 from being smoothly positioned in the desired location.

In an embodiment, since the reflection module 210 is cantilevered relative to the bottom wall of the placement groove 107, to reduce the risk of displacement of the reflection module 210 in the placement groove 107, glue is filled between the reflection module 210 and the inner wall of the placement groove 107. The glue should be prevented from flowing to the above-mentioned first reflection surface 211, thereby affecting the reflection of the optical signal by the first reflection surface 211.

In an embodiment, the photonic chip module 1 includes a photonic chip 100 and a reflection unit 200. The photonic chip 100 includes multiple first transceiving waveguide modules 130. Each first transceiving waveguide module 130 includes a first emitting waveguide 131 for transmitting and emitting detection light, and a first receiving waveguide 132 for receiving and transmitting echo light. The first emergent end 1312 of the first emitting waveguide 131 and the first incident end 1321 of the first receiving waveguide 132 are arranged at intervals along a first preset direction, collectively forming a first transceiving end. The first transceiving ends of the first transceiving waveguide modules 130 are arranged along a second preset direction Y The reflection modules 210 are arranged along the second preset direction Y, each corresponding to one of the first transceiving waveguide modules 130. The first reflection surface 211 of each reflection module 210 is oppositely arranged along the second preset direction Y with the corresponding first transceiving end of the first transceiving waveguide module 130, allowing the detection light reflected by each first reflection surface 211 to be staggered in the second preset direction Y, thereby forming multiple corresponding sub-detection fields externally of the LiDAR, and these sub-detection fields collectively constitute the total detection field of the LiDAR. The photonic chip module 1 provided in the embodiments of the present application is advantageous for increasing the detection field of the LiDAR under the same resolution conditions, or for enhancing the resolution under the same total detection field conditions.

Figure 4:
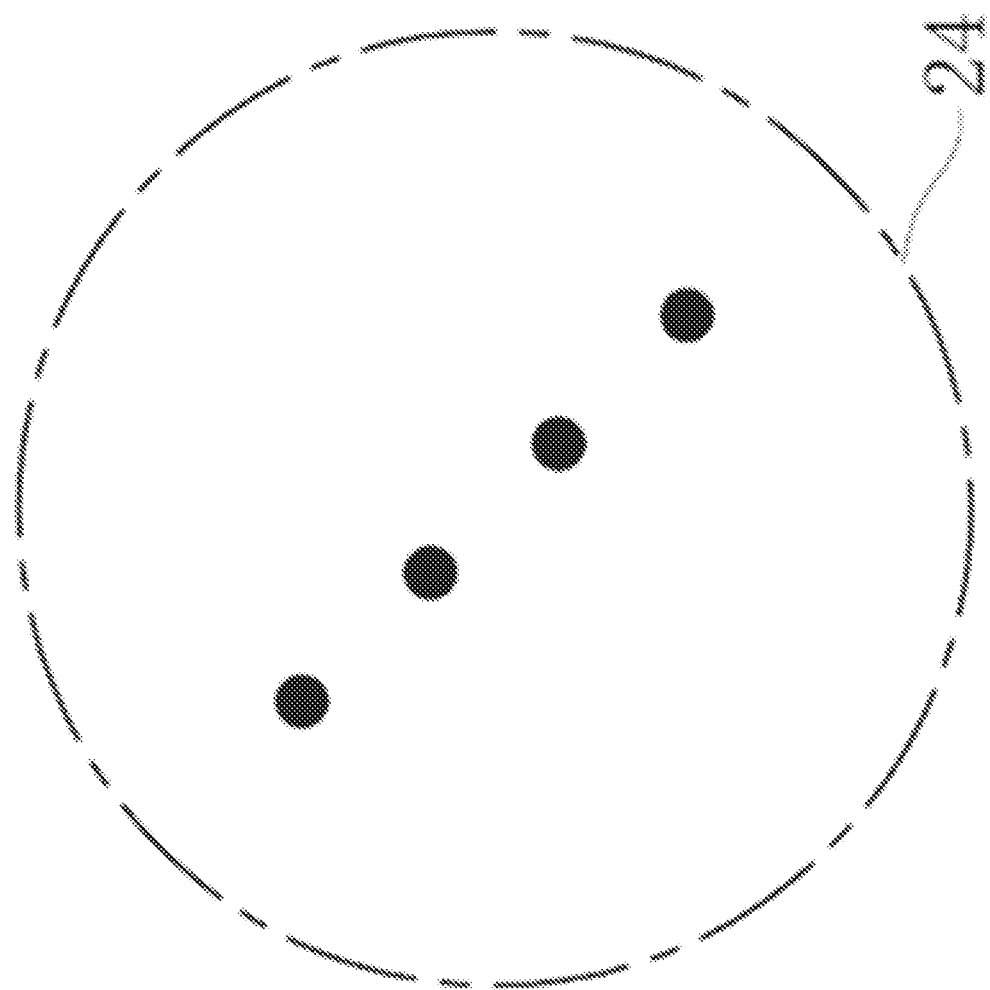
FIG. 4 illustrates a schematic diagram of the spot of detection light on the transceiver lens when each first reflection surface is staggered along both the first preset direction and the second preset direction.
Figure 5:
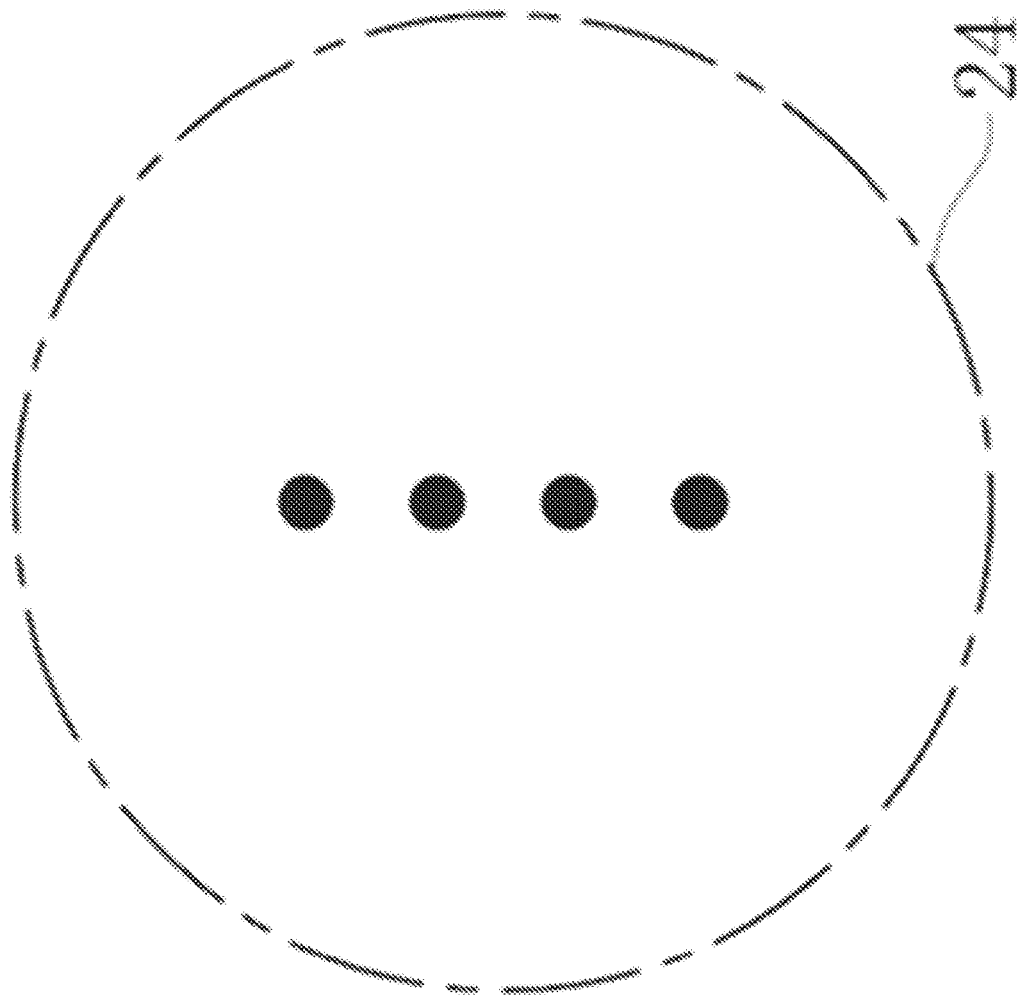
FIG. 5 illustrates a schematic diagram of the spot of detection light on the transceiver lens when each first reflection surface is staggered along the second preset direction.

FIG. 4 illustrates a schematic diagram of the spot of detection light on the transceiver lens when each first reflection surface is staggered along both the first preset direction and the second preset direction. FIG. 5 illustrates a schematic diagram of the spot of detection light on the transceiver lens when each first reflection surface is staggered along the second preset direction.

In an embodiment, the first transceiving waveguide module 130 can also be extended as a whole along the illustrated second preset direction Y, and the first transceiving waveguide modules 130 are staggered in the first preset direction X to avoid interference. Correspondingly, the first reflection surfaces 211 of the reflection modules 210 are set staggered along both the first preset direction X and the second preset direction Y, which can also cause the detection light emitted through the first reflection surface 211 of each reflection module 210 to be staggered in the second preset direction Y, thereby staggering vertically outside the LiDAR. However, in the case of the same number of first transceiving waveguide modules 130, this configuration will cause the detection light reflected by the first reflection surfaces 211 of the reflection modules 210 to be staggered in the first preset direction X, as shown in FIG. 4. On the one hand, this method causes the detection light reflected by the reflection module 210 located on the outer side along the first preset direction X to exceed the boundary of the transceiver lens 24 downstream of the photonic chip module 1 in the LiDAR (along the optical path of the detection light), making this part of the detection light unable to be effectively detected. The detection fields corresponding to different first transceiving waveguide modules 130 are staggered horizontally, making it difficult to stitch the detection fields together using algorithms. In the photonic chip module 1 provided in the embodiments of this application, the reflection modules 210 are only staggered in the second preset direction Y, as shown in FIG. 5, thereby overcoming the above-mentioned shortcomings.

In some embodiments, to enhance the detection field of view or resolution of the LiDAR, the photonic chip 100 also includes multiple second transceiving waveguide modules embedded in the cladding. Correspondingly, the reflection module 210 also has a second reflection surface. In an embodiment, in the same reflection module 210, the second reflection surface 212 and the first reflection surface 211 are parallel to each other and are staggered along the illustrated first preset direction X and second preset direction Y The first reflection surface 211 and the second reflection surface 212 of the same reflection module 210 are located on the same side of an adjacent reflection module 210. When viewed along the first preset direction X, the first reflection surfaces 211 and the second reflection surfaces 212 are alternately arranged along the second preset direction Y The structure of the second transceiving waveguide module 140 is generally similar to the above-mentioned first transceiving waveguide module 130, which includes a second emitting waveguide 141 and a second receiving waveguide 142. The second emitting waveguide 141 has a second emergent end 1412, which is used to transmit detection light and emit the detection light via the second emergent end 1412. The second receiving waveguide 142 has a second incident end 1421, and the second receiving waveguide 142 is used to receive echo light via the second incident end 1421. The second emergent end 1412 and the second incident end 1421 are arranged at intervals along the first preset direction X, and collectively forming the second transceiving end of the second transceiving waveguide module 140. Each second transceiving waveguide module 140 corresponds to a reflection module 210, and the second transceiving end of the second transceiving waveguide module 140 is oppositely arranged with the second reflection surface 212 of the reflection module 210. Consequently, the detection light reflected by each first reflection surface 211 and each second reflection surface 212 will be staggered along the second preset direction Y, thereby further enhancing the total detection field of view in the vertical direction of the LiDAR under the same resolution conditions, or further improving the vertical detection resolution under the same total detection field of view in the vertical direction.

In an embodiment, the second reflection surfaces 212 are arranged along the second preset direction Y to reduce the total number of reflection surfaces offset in the first preset direction X, thereby decreasing the number of detection lights offset in the first preset direction X. In an embodiment, when viewed along the first direction, the first reflection surfaces 211 and the second reflection surfaces 212 are evenly arranged at intervals along the second preset direction Y, thus making the overlapping areas of the sub-detection fields in the vertical directions approximately the same.

The first reflection surface 211 and the second reflection surface 212 staggered in both the first preset direction X and the second preset direction Y, which may bring about issues such as the need for stitching of sub-detection fields of the first transceiving waveguide module 130 and the second transceiving waveguide module 140. However, compared with all the reflection surfaces of the reflection modules 210 staggered in both the first preset direction X and the second preset direction Y, resulting in multiple columns of detection light in the first preset direction X, in this embodiment, each first reflection surface 211 is arranged along the second preset direction Y, and each second reflection surface 212 is arranged along the second preset direction Y, with only two columns of detection light in the first preset direction X, reducing the number of columns. In an embodiment, while maintaining the same vertical detection field and resolution, the above-mentioned impact can still be reduced to some extent.

In some embodiments, the second reflection surfaces 212 may not be arranged along the second preset direction Y, which will, of course, increase the number of detection lights staggered along the first preset direction X.

Figure 7:
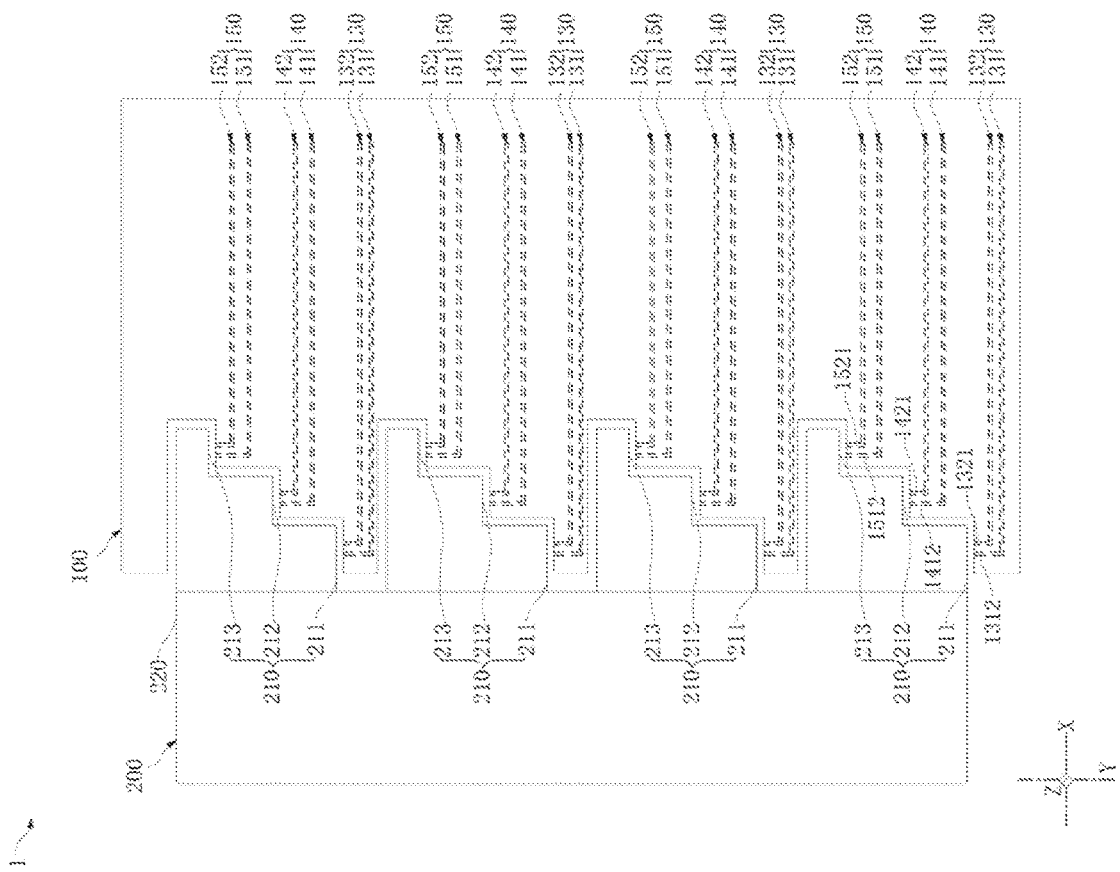
FIG. 7 illustrates a top view of a photonic chip module provided in some embodiments of the present application.

FIG. 7 illustrates a top view of a photonic chip module provided in some embodiments of the present application.

In some embodiments, to enhance the resolution or detection field of view of the LiDAR, the photonic chip 100 also includes multiple third transceiving waveguide modules embedded in the cladding. Correspondingly, the reflection module 210 also has a third reflection surface. In an embodiment, referring to FIG. 7, in the same reflection module 210, the third reflection surface 213 and the first reflection surface 211 are parallel to each other, and the third reflection surface 213 is staggered relative to the first reflection surface 211 and the second reflection surface 212 along the first preset direction X and the second preset direction Y. Along the second preset direction Y, the first reflection surface 211, the second reflection surface 212, and the third reflection surface 213 of the same reflection module are located on the same side of adjacent reflection modules 210, and they are arranged sequentially. Therefore, each first reflection surface 211, each second reflection surface 212, and each third reflection surface 213 are sequentially and cyclically arranged along the second preset direction Y The structure of the third transceiving waveguide module 150 is generally similar to the above-mentioned first transceiving waveguide module 130, which includes a third emitting waveguide 151 and a third receiving waveguide 152. The third emitting waveguide 151 has a third emergent end 1512, and the third emitting waveguide 151 is used to transmit detection light and emit the detection light via the third emergent end 1512. The third receiving waveguide 152 has a third incident end 1521, and the third receiving waveguide 152 is used to receive echo light via the third incident end 1521. The third emergent end 1512 and the third incident end 1521 are arranged at intervals along the first preset direction X, and collectively forming the transceiving end of the third transceiving waveguide module 150. Each third transceiving waveguide module 150 corresponds to a reflection module 210, and the third transceiving end of the third transceiving waveguide module 150 is oppositely arranged with the third reflection surface 213 of the reflection module 210. As a result, the detection light reflected by each first reflection surface 211, each second reflection surface 212, and each third reflection surface 213 will be staggered along the second preset direction Y, thereby further enhancing the total detection field of view in the vertical direction of the LiDAR under the same resolution conditions, or further improving the vertical detection resolution under the same total detection field of view in the vertical direction.

The first reflection surface 211, the second reflection surface 212, and the third reflection surface 213 staggered in both the first preset direction X and the second preset direction Y, which to some extent may bring about issues such as the need for stitching of sub-detection fields corresponding to the first transceiving waveguide module 130, the second transceiving waveguide module 140, and the third transceiving waveguide module 150. However, compared to all reflection surfaces of the reflection modules 210 being staggered in both the first preset direction X and the second preset direction Y, resulting in a multi-column detection light scheme in the first preset direction X, in this embodiment, each first reflection surface 211 is arranged along the second preset direction Y, each second reflection surface 212 is arranged along the second preset direction Y, and each third reflection surface 213 is arranged along the second preset direction Y The number of detection light columns staggered in the first preset direction X is only three, with fewer columns. In this embodiment, based on the same vertical detection field and resolution, the above-mentioned impact can still be reduced to some extent.

In some embodiments, multiple reflection surfaces are set on the same integrated structure of the reflection module 210, namely the first reflection surface 211 and the second reflection surface 212 (or, the first reflection surface, the second reflection surface, and the third reflection surface). Multiple reflection surfaces staggered along the first preset direction X and the second preset direction Y are integrated into an integrated structure of the reflection module 210. In some embodiments, the components associated with the first reflection surface 211 and the second reflection surface 212 can also be two relatively independent components. For example, the reflection module 210 includes two reflection elements, wherein one reflection element is provided with the first reflection surface 211, and the other reflection element is provided with the second reflection surface 212.

Figure 8:
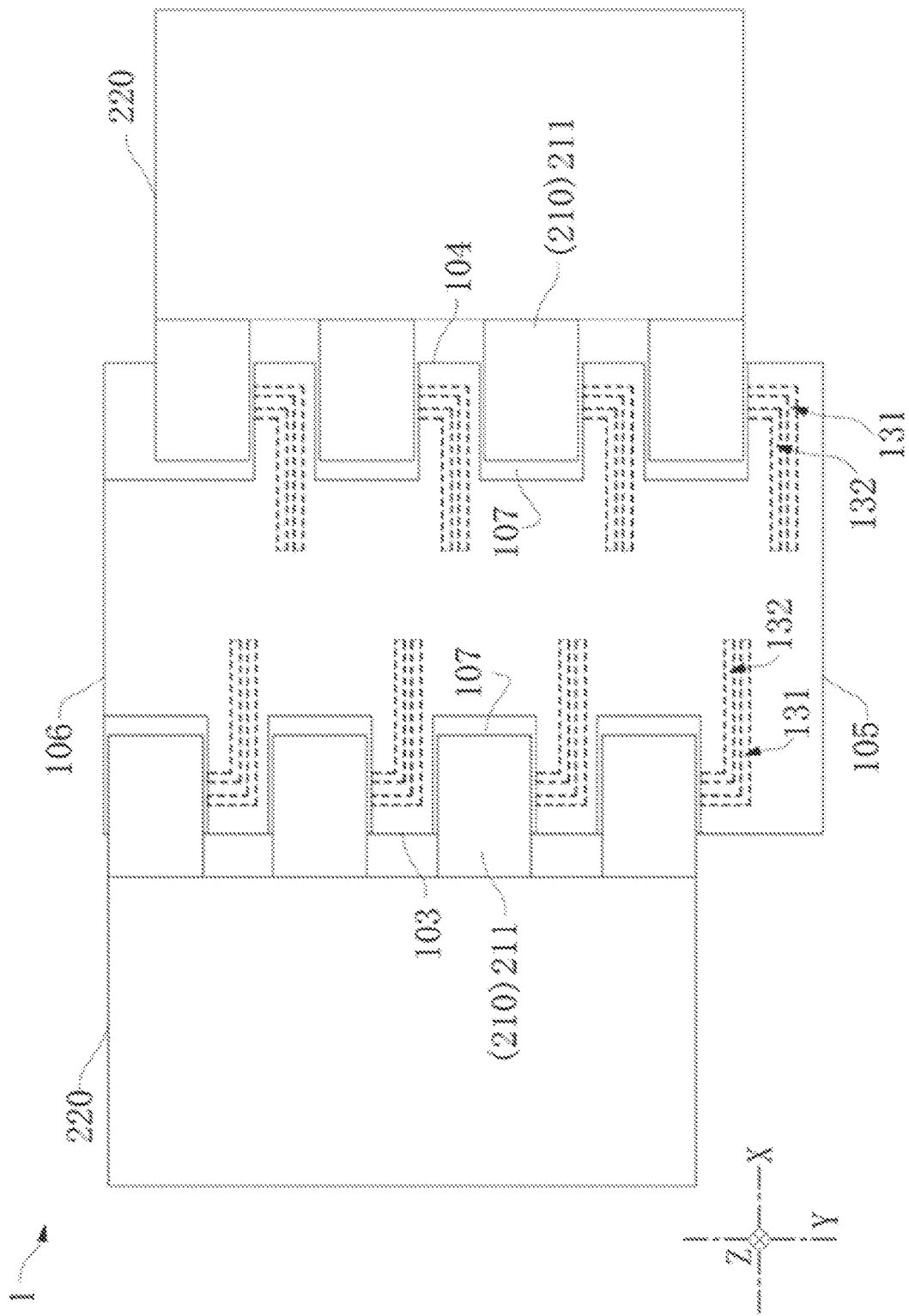
FIG. 8 illustrates a top view of a photonic chip module provided in some embodiments of the present application.

FIG. 8 illustrates a top view of a photonic chip module provided in some embodiments of the present application.

In an embodiment, referring to FIG. 8, the photonic chip module 1 includes at least two reflection modules 200, with the reflection modules 200 staggered between each other along the first preset direction X and the second preset direction Y Correspondingly, the first surface 101 is provided with multiple columns of placement grooves 107 staggered along the first preset direction X, each column of placement grooves 107 corresponding to one reflection unit 200, viewed along the first preset direction X. The first reflection surfaces 211 of the reflection modules 210 are staggered along the second preset direction.

In an embodiment, the photonic chip module 1 includes two reflection modules 200, with the two reflection modules 200 positioned at both ends of the first surface 101 along the first preset direction X. In some other embodiments, the placement positions of the two reflection modules 200 can also be varied based on the description above, or include a greater number of reflection modules 200. In an embodiment, the first input end 1311 of each first transceiving waveguide module 130 can extend away from the corresponding first emergent end 1312 towards the third side 105 or the fourth side 106, making it easier for each first transceiving waveguide module 130 to access to the detection light.

Figure 6:
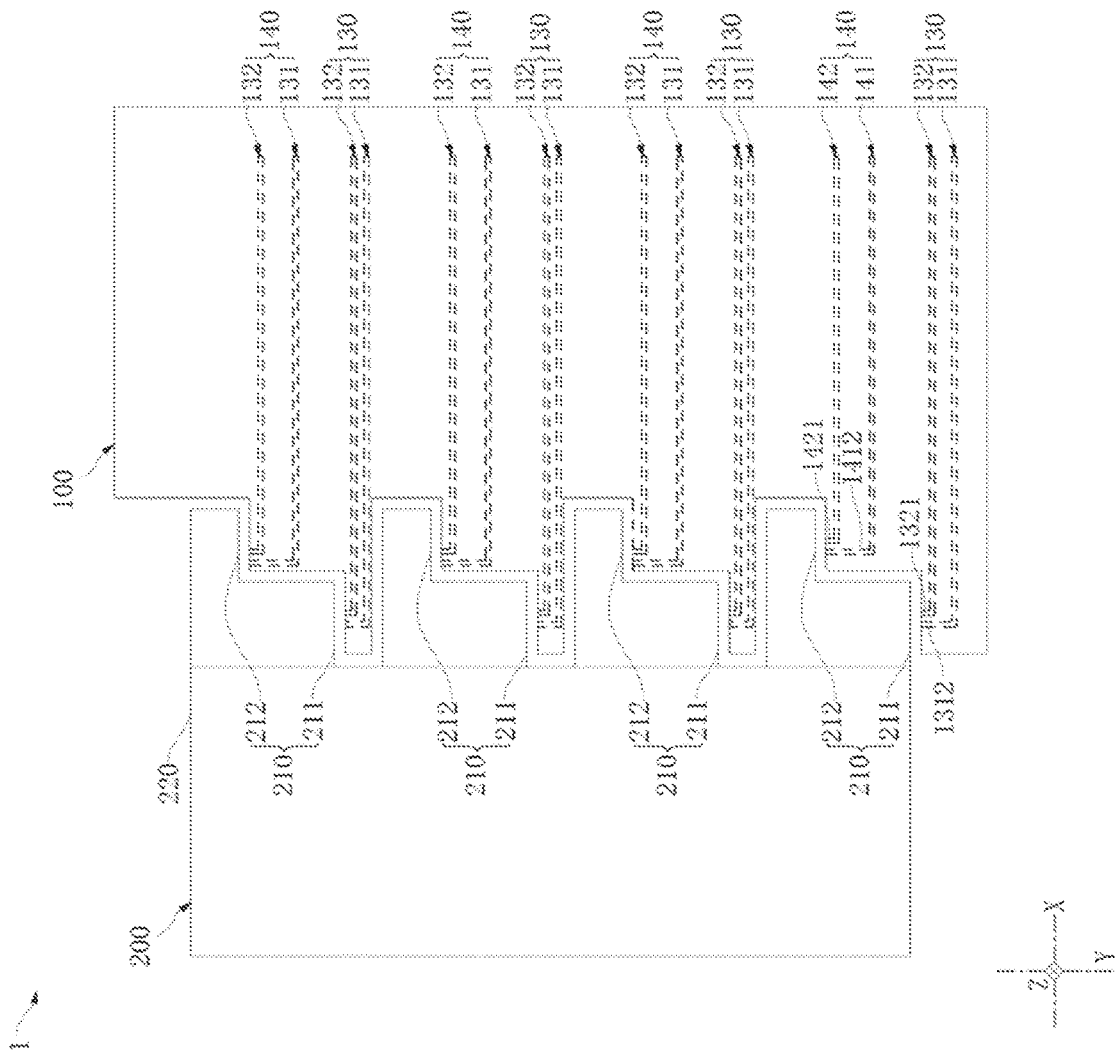
FIG. 6 illustrates a top view of a photonic chip module provided in some embodiments of the present application.

FIG. 6 illustrates a top view of a photonic chip module provided in some embodiments of the present application.

In the embodiment shown in FIG. 6, along the second preset direction Y, the spacing between any adjacent first reflection surface 211 and second reflection surface 212 along the second preset direction Y is the sum of the width value of the placement groove 107 along the second preset direction Y and the wall thickness value between the two placement grooves 107. In this embodiment as shown in FIG. 8, the spacing between any two adjacent first reflection surfaces 211 along the second preset direction Y is less than the aforementioned sum value. This is advantageous for improving the tolerance of the photonic chip module 1 when emitting detection light to the transceiver lens, as a smaller spacing helps ensure that the detection light propagates without exceeding the light collection range boundary of the transceiver lens, and also facilitates the setting of more reflection modules 210 in each reflection unit 200 to further enhance the detection resolution of the LiDAR. As long as the first transceiver ends of each first transceiving waveguide module 130 are arranged along the second preset direction Y, the first reflection surfaces 211 of each reflection module 210 are arranged along the second preset direction Y, and each first transceiver end corresponds to and is oppositely arranged with a first reflection surface 211, allowing the detection light reflected by each reflection module 210 to be staggered along the second preset direction Y is sufficient.

In an embodiment, at least two adjacent first transceiving waveguide modules 130 satisfy: the direction in which the first transceiver ends of the two first transceiving waveguide modules 130 point to the corresponding first reflection surfaces 211 is in opposite directions, and the first reflection surfaces 211 corresponding to the two first transceiving waveguide modules 130 are arranged in a mirrored manner.

Figure 9:
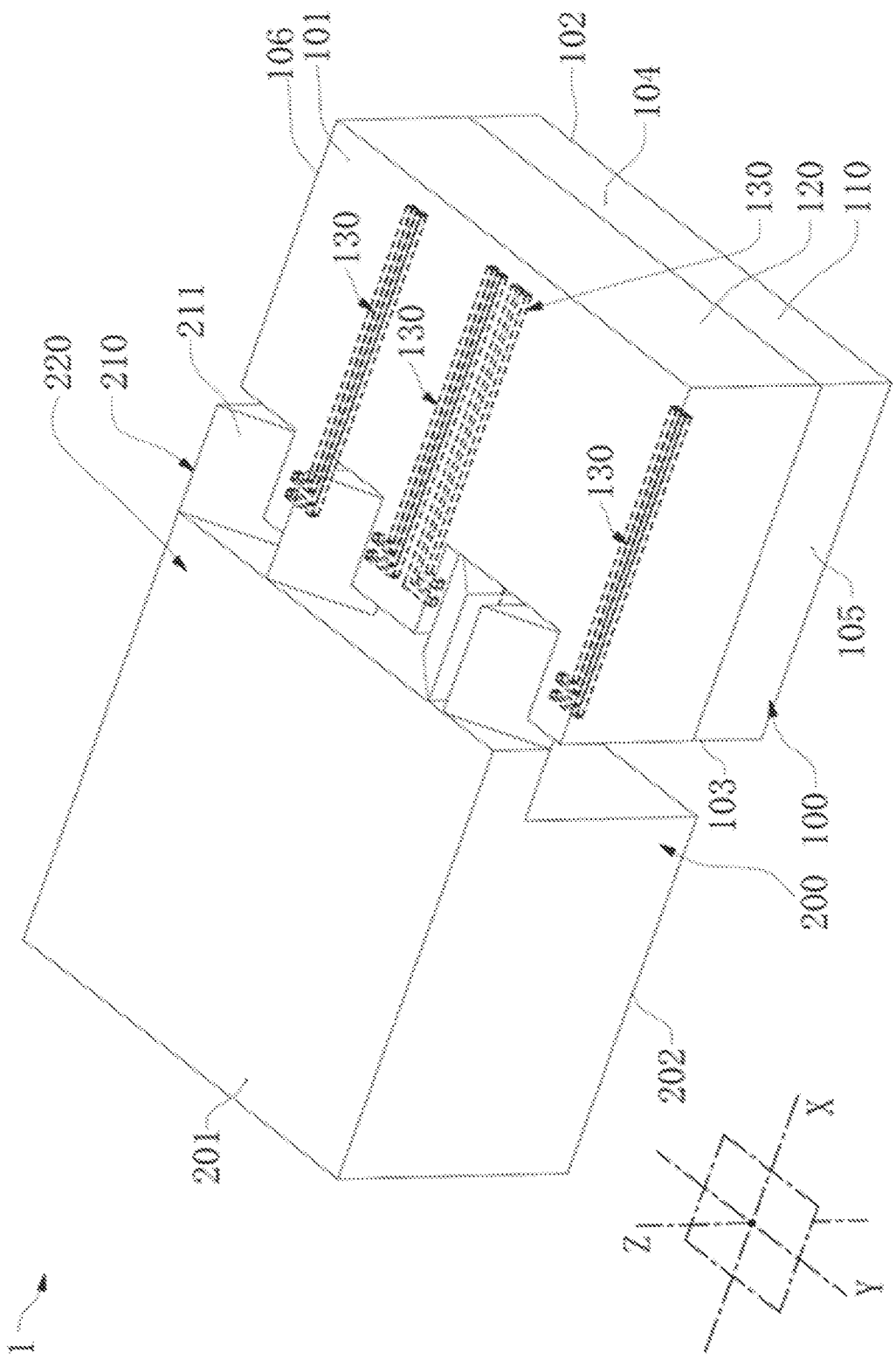
FIG. 9 illustrates a perspective view of a photonic chip module provided in some embodiments of the present application.

FIG. 9 illustrates a perspective view of a photonic chip module provided in some embodiments of the present application.

In an embodiment, refer to FIG. 9, which shows a three-dimensional schematic of the photonic chip module 1. The direction in which the first transceiving waveguide module 130, the first one from bottom to top, points to the first reflection surface 211 of the corresponding reflection module 210 is illustrated from bottom to top, and the third and fourth ones are the same. The direction in which the second first transceiving waveguide module 130 points to the first reflection surface 211 of the corresponding reflection module 210 is from top to bottom, and the first reflection surface 211 of the second reflection module 210 is arranged in a mirrored manner with the first reflection surface 211 of the first reflection module 210. The photonic chip module 1 can also achieve that the detection light emitted through each first reflection surface 211 can be staggered in the second preset direction Y, thereby forming multiple corresponding detection fields outside the LiDAR, and all detection fields together constitute the total detection field of the LiDAR.

In an embodiment, the placement groove 107 can be blind along the thickness direction Z of the photonic chip 100, namely a blind groove, or it can pass through the photonic chip 100 along the thickness direction Z of the photonic chip 100, namely a through groove.

Figure 10:
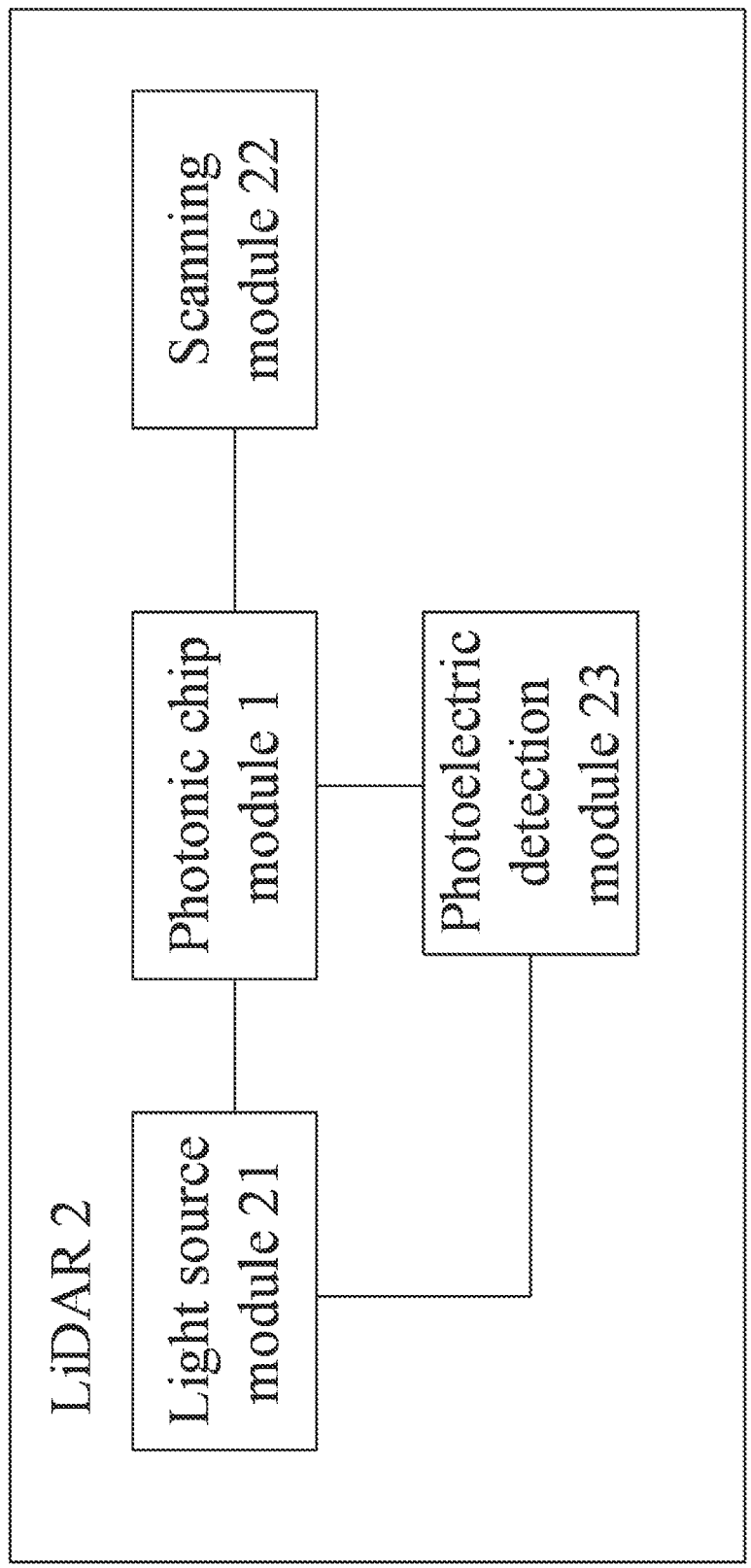
FIG. 10 illustrates a schematic diagram of a LiDAR provided in some embodiments of the present application.

FIG. 10 illustrates a schematic diagram of a LiDAR provided in some embodiments of the present application.

In an embodiment, refer to FIG. 10, a LiDAR 2 is provided, including the photonic chip module 1. The LiDAR 2 includes a light source module 21, the photonic chip module 1, a scanning module 22, and a photoelectric detection module 23. The light source module 21 is used to generate detection light and local oscillator light. For example, the light source module 21 includes a laser and a beam splitter, where the laser is used to generate the source light signal, and the beam splitter receives the source light signal and splits it to obtain the detection light for detecting target objects and the local oscillator light used as coherent reference. The photonic chip module 1 is used to receive the detection light and emit the detection light, as well as to receive the echo light. The scanning module 22 includes rotatable elements that are used to perform two-dimensional scanning of the detection light to create a corresponding detection field outside the LiDAR. The scanning module is also used to receive the echo light and guide the echo light towards the photonic chip module 1. The scanning module 22 can include a multi-faceted mirror and/or a galvanometer. The photoelectric detection module 23 is used to receive the local oscillator light and the echo light to obtain beat frequency signals. The photoelectric detection module 23 can include a photodetector or a photomixer with a balanced photodetector. To enhance the overall integration of the LiDAR, the photoelectric detection module 23 can be integrated into the photonic chip 100. In some embodiments, the photoelectric detection module 23 can also be independently positioned relative to the photonic chip module 1.

The LiDAR 2 provided by the embodiments is advantageous for increasing the detection field of view of the LiDAR at the same resolution, or for improving the resolution under the same total detection field of view.

Figure 11:
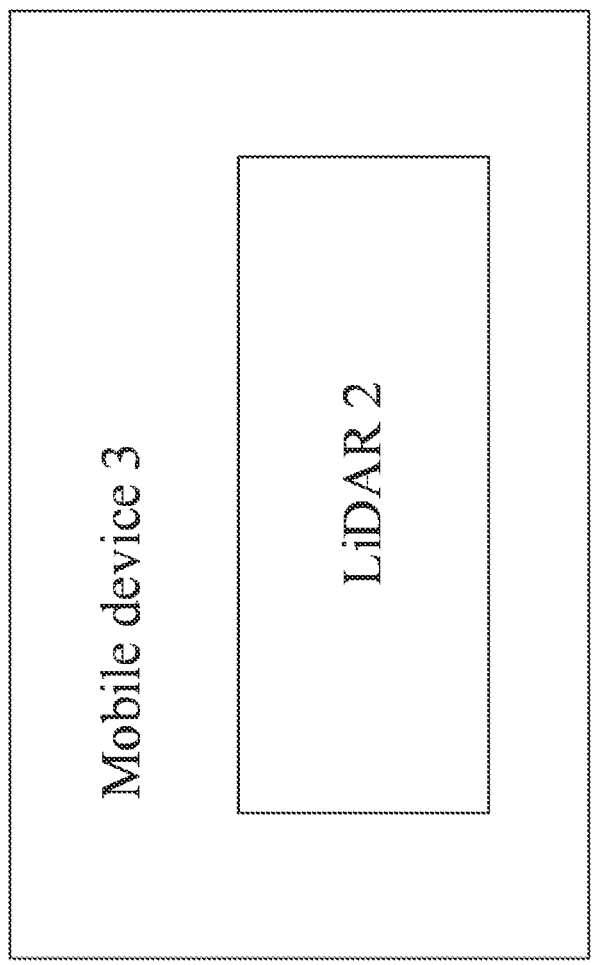
FIG. 11 illustrates a schematic diagram of a mobile device provided in some embodiments of the present application.

FIG. 11 illustrates a schematic diagram of a mobile device provided in some embodiments of the present application.

In an embodiment, referring to FIG. 11, a mobile device 3 is provided, which includes the above-mentioned LiDAR 2. In an embodiment, the mobile device 3 is a car, and the mobile device can also be any mobile tool equipped with the LiDAR 2, such as an electric vehicle, a drone, a robot, and so on.

The mobile device 3 provided in the embodiments is advantageous for increasing the detection field of view of the LiDAR at the same resolution, or for improving the resolution under the same total detection field of view.

In the embodiments of this application, terms such as "first," "second," etc., are used for descriptive purposes only and should not be construed as indicating or implying relative importance. Unless otherwise stated, "multiple" refers to two or more. "And/or," describing the relationship between associated objects, indicates that there can be three possibilities, for example, A and/or B can mean: only A exists, both A and B exist, or only B exists. The character "/" generally signifies an "or" relationship between the preceding and following associated objects.

What is claimed is:

1. A photonic chip module, comprising:
   a photonic chip, comprising a cladding and a plurality of first transceiving waveguide modules embedded in the cladding, wherein: the first transceiving waveguide module comprises a first emitting waveguide and a first receiving waveguide, the first emitting waveguide has a first emergent end, the first emitting waveguide is configured to transmit detection light and emit the detection light via the first emergent end, the first receiving waveguide has a first incident end, the first receiving waveguide is configured to receive echo light via the first incident end, the echo light is formed by a target object reflecting the detection light, observing along a thickness direction of the photonic chip, the first emergent end and the first incident end are arranged at intervals along a first preset direction, the first emergent end and the first incident end collectively form a first transceiving end of the first transceiving waveguide module, and the first transceiving ends of the first transceiving waveguide modules are arranged at intervals along a second preset direction; and a reflection unit, comprising a plurality of reflection modules, wherein: the plurality of reflection modules are arranged along the second preset direction, each of the reflection modules corresponds to one of the first transceiving waveguide modules, the photonic chip has a first surface and a second surface that are opposite each other along the thickness direction, the first surface is provided with a placement groove for holding at least a part of a reflection module, the reflection module has a first reflection surface, the first transceiving end of the first transceiving waveguide module and the first reflection surface are oppositely arranged along the second preset direction, the first reflection surface is configured to reflect the detection light, so that the detection light is emitted in a direction that is not perpendicular to the thickness direction, the first reflection surface is configured to reflect the echo light, so that the echo light is directed to the first receiving waveguide, wherein the first preset direction, the second preset direction and the thickness direction are perpendicular two-by-two.

2. The photonic chip module according to claim 1, wherein the direction in which each of the first transceiver end points to a corresponding first reflection surface is a same pointing direction.

3. The photonic chip module according to claim 1, wherein the first reflection surfaces are arranged in parallel to each other.

4. The photonic chip module according to claim 3, wherein first reflection surfaces are arranged evenly at intervals along the second preset direction.

5. The photonic chip module according to claim 2, wherein the reflection module further comprises a second reflection surface;

wherein the second reflection surface and the first reflection surface in a same reflection module are parallel to each other and are staggered along the first preset direction and the second preset direction, and the first reflection surface and the second reflection surface in the same reflection module are on a same side of an adjacent reflection module; and wherein: the photonic chip further comprises a plurality of second transceiving waveguide modules embedded in the cladding; each of the second transceiving waveguide modules corresponds to one of second reflection surfaces; the second transceiving waveguide module comprises a second emitting waveguide and a second receiving waveguide; the second emitting waveguide has a second emergent end; the second emitting waveguide is configured to transmit the detection light and emit the detection light via the second emergent end; the second receiving waveguide has a second incident end, and the second receiving waveguide is configured to receive the echo light via the second incident end; the second emergent end and the second incident end are arranged at intervals along the first preset direction; the second emergent end and the second incident end collectively form a second transceiving end of the second transceiving waveguide module; and the second transceiving end and the second reflection surface are oppositely arranged along the second preset direction.

6. The photonic chip module according to claim 5, wherein the second reflection surfaces are arranged along the second preset direction.

7. The photonic chip module according to claim 6, wherein when viewed along the first preset direction, each of the first reflection surfaces and each of the second reflection surfaces are evenly arranged at intervals along the second preset direction.

8. The photonic chip module according to claim 5, wherein the reflection module further comprises a third reflection surface;

wherein: the third reflection surface and the first reflection surface in the same reflection module are parallel to each other; the third reflection surface is staggered along the first preset direction and the second preset direction relative to the first reflection surface and the second reflection surface; and the first reflection surface, the second reflection surface, and the third reflection surface in the same reflection module are on the same side of an adjacent reflection module along the second preset direction, and are arranged in sequence; and wherein: the photonic chip further comprises a plurality of third transceiving waveguide modules embedded in the cladding; each of the third transceiving waveguide modules corresponds to one of third reflection surfaces; the third transceiving waveguide module comprises a third emitting waveguide and a third receiving waveguide, and the third emitting waveguide has a third emergent end; the third emitting waveguide is configured to transmit the detection light and emit the detection light via the third emergent end; the third receiving waveguide has a third incident end, and the third receiving waveguide is configured to receive the echo light via the third incident end; the third emergent end and the third incident end are arranged at intervals along the first preset direction; and the third emergent end and the third incident end collectively form a third transceiving end of the third transceiving waveguide module, and the third transceiving end and the third reflection surface are oppositely arranged along the second preset direction.

9. The photonic chip module according to claim 8, wherein the third reflection surfaces are arranged along the second preset direction.

10. The photonic chip module according to claim 8, wherein when viewed along the first preset direction, each of the first reflection surfaces, each of the second reflection surfaces, and each of the third reflection surfaces are disposed sequentially and evenly spaced apart along the second preset direction.

11. The photonic chip module according to claim 1, wherein the photonic chip has a first side and a second side that are oppositely arranged along the first preset direction; and wherein the placement groove is located at an end of the photonic chip close to the first side, and an end of the placement groove along the first preset direction extends to the first side.

12. The photonic chip module according to claim 1, wherein the photonic chip has a third side and a fourth side that are oppositely arranged along the second preset direction;
- wherein the third side is located on a side of the first reflection surface facing a corresponding first transceiving waveguide module; and
- wherein an end of the placement groove along the second preset direction close to the fourth side extends to the fourth side.

13. The photonic chip module according to claim 1, wherein the reflection unit further comprises a base; and
- wherein the base is located on one side of the photonic chip having the placement groove along the first preset direction, and the reflection modules are fixed between the base.

14. The photonic chip module according to claim 1, wherein there is a gap between the reflection module and a bottom wall of the placement groove.

15. The photonic chip module according to claim 14, wherein the gap is filled with glue.

16. The photonic chip module according to claim 1, wherein the photonic chip module comprises at least two reflection units;
- wherein the reflection units are staggered along the first preset direction and the second preset direction, and the first surface is provided with multiple columns of placement grooves staggered along the first preset direction; and
- wherein each column of placement grooves corresponds to one of the reflection units, so that: viewing along the first preset direction, the first reflection surface of each reflection module is staggered along the second preset direction.

17. The photonic chip module according to claim 1, wherein at least two adjacent first transceiving waveguide modules satisfy: directions in which first transceiving ends of the two adjacent first transceiving waveguide modules point to corresponding first reflection surfaces are opposite pointing directions; and
- wherein the at least two adjacent first transceiving waveguide modules further satisfy: first reflection surfaces corresponding to the two adjacent first transceiving waveguide modules are arranged in a mirrored manner.

\* \* \* \* \*